No. 647,659. Patented Apr. 17, 1900.
J. HALLAM.
RUBBER TREAD TIRE FOR VEHICLES.
(Application filed July 24, 1899.)
(No Model.)
Fig. 1.
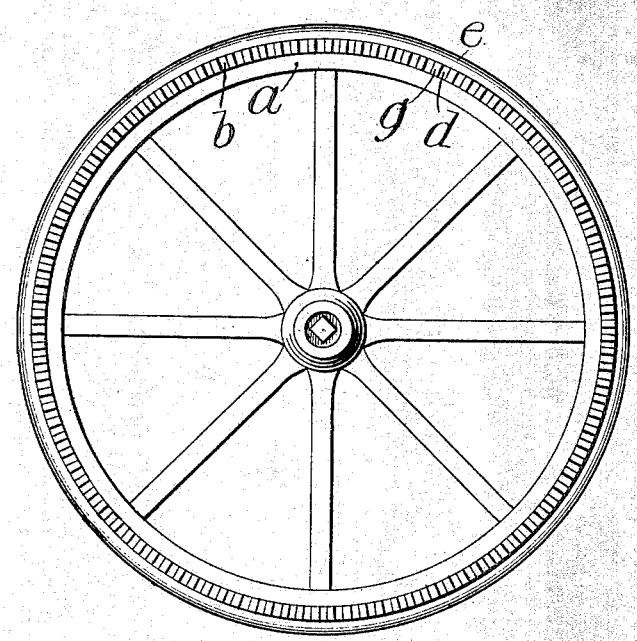
Fig. 2. Fig. 4. Fig. 3.
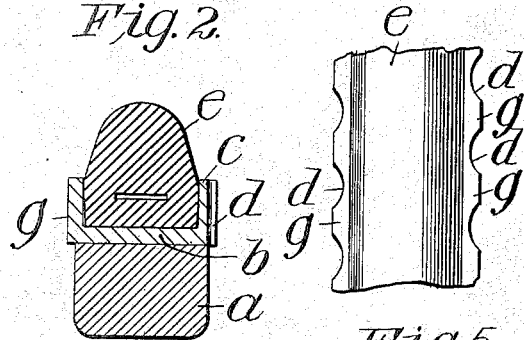
Fig. 5.
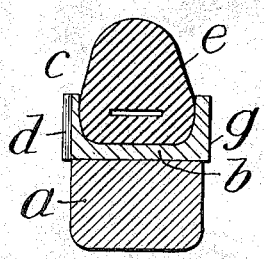
Witnesses:
C. L. Belcher
C. Sedgwick
Inventor
John Hallam
By
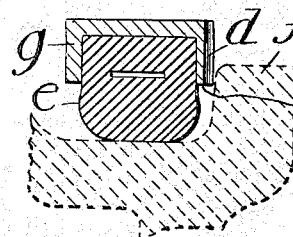
Attorney

UNITED STATES PATENT OFFICE.

JOHN HALLAM, OF NEW YORK, N. Y.

RUBBER-TREAD TIRE FOR VEHICLES.

SPECIFICATION forming part of Letters Patent No. 647,659, dated April 17, 1900.

Application filed July 24, 1899. Serial No. 724,961. (No model.)

*To all whom it may concern:*

Be it known that I, JOHN HALLAM, a citizen of the United States of America, and a resident of the borough of Brooklyn, New York city, in the State of New York, have invented certain new and useful Improvements in Rubber-Tread Tires for Vehicles, of which the following is a specification.

My invention relates to the grooved metal rim by which the rubber tread is secured to the wheel-rim; and it consists in a novel construction of said metal rim for adapting it to more effectually climb the edges of car-rails diagonally, as hereinafter described, reference being made to the accompanying drawings, in which—

Figure 1 is a side elevation of a vehicle-wheel having a rubber-tread tire in accordance with my invention. Figs. 2 and 3 are transverse sections of the wheel rim and tire on an enlarged scale. Fig. 4 is a face view of a short section of the tire. Fig. 5 is a transverse section of the wheel-rim in connection with dotted outlines of a rail-section, illustrating the operation of the invention.

The wood or other wheel-rim is represented at $a$. $b$ represents the bottom, and $c$ flanges, of a channel-bar metal rim formed so that the flanges are on the exterior side, and thus having a deep groove in the face for receiving the rubber tread $e$ and holding it effectually in place, said rim to be shrunk on the wood rim, as usual. In the outsides of these flanges $c$ I make deep and wide grooves $d$ transversely of the flanges and radially to the center of the wheel, forming intervening projections $g$, which are intended to bite the edges of car-rails when the wheels are turned diagonally to the rails for crossing and help the rubber treads to rise onto the rails instead of resisting such action, as plain edges of the flanges would. The rubber treads normally project from the edges of the flanges about as much as the height of the rail-heads $f$ and are rounded or inclined in the projecting part, as shown in the cross-sections, which is unfavorable to climbing the rail-heads when turned for crossing, especially during the first part of the turn, while the angle is very acute.

The compression of the tread under the load depresses the edges of the flanges a little below the surface of the rail-head, but not to the surface under the tread, which enables the projections to give more effective starting rise of the tire than is afforded by such projections in the edges of plain flat metal tires, which I am aware have been used, also metal tires with notches in the edges of such flanges as I use, but without the rubber treads and not being notched in the sides of the flanges, and I do not claim such devices. I am also aware that rotatable rims have been applied to the sides of wood rims independently of tire-rim and having ribs and grooves on the outside to bite the rail edges, and I am also aware that a metallic bicycle-rim grooved for reception of the rubber tread has been provided with thin corrugated tread-retaining flanges as a means of preventing the creeping of the rubber treads by the gripping of the inner ribs into the easily-compressible substance of the tread; but such a device is not feasible for the purposes of my invention, because such light thin metal as may be thus corrugated will not be as substantial as necessary to sustain the shocks on the edges, but will bend inward, and thus favor the slipping which it is the purpose of my invention to avoid, and the edges are so covered by the rubber which fills the inside grooves of the corrugations and expands more or less over the edges of the ribs gripping into it that the edges are crowded away from the rails.

My invention relates only to grooved metal rims to be shrunk on wood rims and having flanges with plain inner sides and corrugated outer sides and of such substantial structure as to sustain the shocks of the same for which they are intended and being integral with the part to be shrunk on the face of the wood rim.

What I claim as my invention is—

In rubber-tread tires for wood-rim vehicle-wheels, the combination of a channel-bar metal rim having the flanges on the exterior integral with the part to be shrunk on the wood rim, and a rubber tread secured in the channel of said rim with a part projecting radially from the edges of the flanges and being rounded or tapered in cross-section of the projecting part, the flanges of said rim having the outer sides corrugated or ribbed and grooved and being plain on the inside substantially as described.

Signed by me at New York, N. Y., this 15th day of July, 1899.

JOHN HALLAM.

Witnesses:
A. P. THAYER,
C. SEDGWICK.